(12) United States Patent
Alpers et al.

(10) Patent No.: US 10,459,933 B2
(45) Date of Patent: Oct. 29, 2019

(54) IDENTIFICATION AND ELIMINATION OF NON-ESSENTIAL STATISTICS FOR QUERY OPTIMIZATION

(71) Applicant: International Business Machines Corporation, Armonk, NY (US)

(72) Inventors: Jason L. Alpers, Lee's Summit, MO (US); Patrick D. Bossman, Sarasota, FL (US); Terence P. Purcell, Springfield, IL (US)

(73) Assignee: International Business Machines Corporation, Armonk, NY (US)

( * ) Notice: Subject to any disclaimer, the term of this patent is extended or adjusted under 35 U.S.C. 154(b) by 571 days.

(21) Appl. No.: 14/855,928

(22) Filed: Sep. 16, 2015

(65) Prior Publication Data
US 2017/0075954 A1   Mar. 16, 2017

(51) Int. Cl.
  *G06F 16/2458* (2019.01)
  *G06F 16/2453* (2019.01)
  *G06F 16/2455* (2019.01)

(52) U.S. Cl.
  CPC ...... *G06F 16/2462* (2019.01); *G06F 16/2453* (2019.01); *G06F 16/2455* (2019.01); *G06F 16/24542* (2019.01)

(58) Field of Classification Search
  None
  See application file for complete search history.

(56) References Cited

U.S. PATENT DOCUMENTS

| | | | |
|---|---|---|---|
| 6,363,371 B1 | 3/2002 | Chaudhuri et al. | |
| 6,366,901 B1 | 4/2002 | Ellis | |
| 7,146,363 B2 | 12/2006 | Waas et al. | |
| 7,213,012 B2 | 5/2007 | Jakobsson et al. | |
| 8,073,841 B2 | 12/2011 | Tarachandani et al. | |
| 2006/0149695 A1* | 7/2006 | Bossman | G06F 17/30315 706/48 |
| 2010/0332472 A1 | 12/2010 | Graefe et al. | |
| 2011/0022581 A1 | 1/2011 | Korlapati | |
| 2013/0166486 A1* | 6/2013 | Kim | G06Q 10/101 706/46 |
| 2014/0108378 A1* | 4/2014 | Alpers | G06F 17/30469 707/716 |

FOREIGN PATENT DOCUMENTS

EP     1548612     6/2005

OTHER PUBLICATIONS

List of IBM Patents or Patent Applications Treated as Related, Jan. 6, 2017.
Sadri et al., "Optimization of Sequence Queries in Database Systems", PODS '01 Santa Barbara, California USA, copyright 2001, pp. 71-81.

* cited by examiner

*Primary Examiner* — Giuseppi Giuliani
(74) *Attorney, Agent, or Firm* — Richard Wilhelm; Edell, Shapiro & Finnan, LLC

(57) ABSTRACT

According to an embodiment of the present invention, methods, systems, and computer readable media are provided for collecting statistics for use in optimizing a database query. Collected statistics for the database are compared to corresponding predetermined states of conditions for optimizing the database query. One or more collected statistics in compliance with the corresponding predetermined states of conditions are identified based on the comparison. Collection of the one or more identified statistics for the query optimization is disabled.

12 Claims, 5 Drawing Sheets

IDENTIFICATION AND ELIMINATION OF NON-ESSENTIAL STATISTICS FOR QUERY OPTIMIZATION

BACKGROUND

Present invention embodiments relate to database queries, and more specifically, to identifying and discarding non-essential statistics used for query optimization.

Statistics may be used to characterize content of data stored in a database system in order to ensure good query performance. As the data stored in the database grows in size and changes in content over time, corresponding statistics may no longer accurately reflect the content of the data stored in the database.

Whether to remove a statistic is generally determined based upon knowledge of a particular query or a set of queries (a query domain). However, since the determination to remove a particular statistic is based upon known queries, subsequent new or unknown queries not falling within the query domain may lead to a substantial regression in query performance.

SUMMARY

According to an embodiment of the present invention, methods, systems, and computer readable media are provided for collecting statistics for use in optimizing a database query. Collected statistics for the database are compared to corresponding predetermined states of conditions for optimizing the database query. One or more collected statistics in compliance with the corresponding predetermined states of conditions are identified based on the comparison. Collection of the one or more identified statistics for the query optimization is disabled.

These and other aspects, features and advantages of the present invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE SEVERAL VIEWS OF THE DRAWINGS

Generally, like reference numerals in the various figures are utilized to designate like components.

DETAILED DESCRIPTION

Statistics reflecting the content of data stored in a database system help ensure selection of efficient access paths by a query optimizer for executing queries in a relational database management system. Statistics enable estimation or actual determination of the number of qualified rows (the number of rows selected) for each step of a query. By utilizing statistics to determine a potential amount of data or an actual amount of data involved in executing each step of a query, an estimate of the amount of time needed to execute the query for each access path may be determined, and an optimal access path selected.

While some statistics are crucial for optimizing query performance, other statistics do not provide value to query optimization, but rather, incur overhead from collection of the statistics. Distinguishing between statistics that provide value and those that do not provide value and discarding the statistics that do not provide value will improve query performance. Likewise removing a statistic that provides value may incur a negative impact on the performance of the query, and lead to query performance regression.

In terms of collecting and storing statistics, a given statistic has both a collection cost associated with the cost of collecting the statistic based on analyzing the data stored in the database, and a query optimization cost associated with an impact of executing the query utilizing the statistic.

According to present invention embodiments, methods, systems and computer readable media are provided for selectively eliminating the collection and retention of statistics that do not provide value for query optimization. Collected statistics that do not provide value to the query optimizer, e.g., collected frequency or distribution statistics that do not substantially change the underlying assumptions (predetermined states of conditions) that the query optimizer makes about the frequency or the distribution of the data, are identified and eliminated.

Present invention embodiments identify and eliminate statistics in a query independent manner, e.g., in a manner that is not dependent upon the specific terms of the query. Rather, according to present invention embodiments, the entire statistic space for data is considered, regardless of the particular term(s) of the query, and therefore, the risk of performance regression is minimized.

Figure 1:
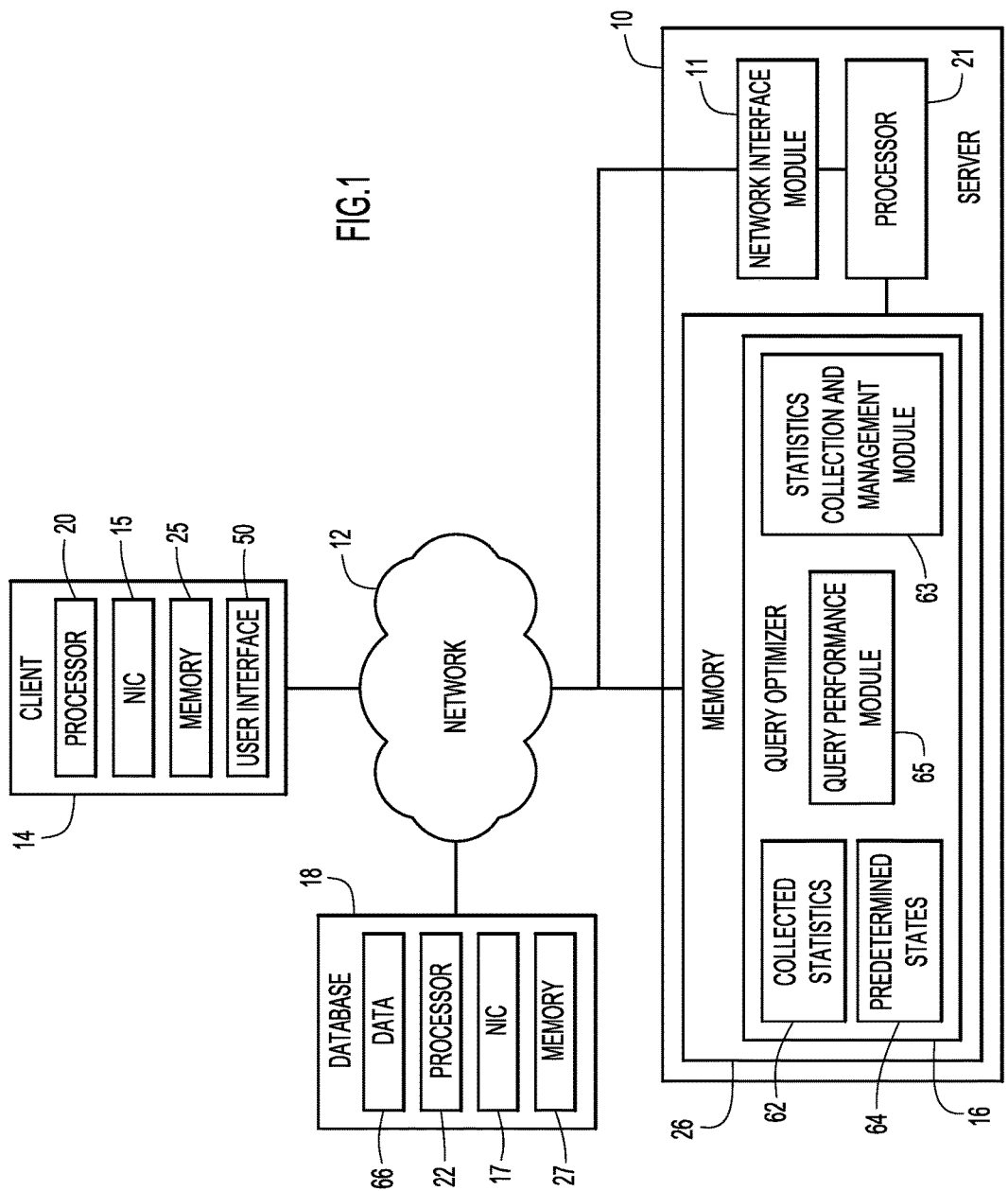
FIG. 1 is an example hardware environment in accordance with an embodiment of the present invention.

An example environment for use with present invention embodiments is illustrated in FIG. 1. Specifically, the environment includes one or more server systems 10, and one or more client or end-user systems 14. Server systems 10 and client systems 14 may be remote from each other and communicate over a network 12. The network may be implemented by any number of any suitable communications media (e.g., wide area network (WAN), local area network (LAN), Internet, Intranet, etc.). Alternatively, server systems 10 and client systems 14 may be local to each other, and may communicate via any appropriate local communication medium (e.g., local area network (LAN), hardwire, wireless link, Intranet, etc.).

Client systems 14 enable users to submit queries (requests for information) to server systems 10 to conduct database queries. Client systems 14 may be implemented by any conventional or other computer systems preferably equipped with a display or monitor, a base (e.g., including at least one processor 20, one or more memories 25 and/or internal or external network interfaces or communications devices 15 (e.g., modem, network cards, etc.)), optional input devices (e.g., a keyboard, mouse or other input device), and any commercially available and custom software (e.g., server/communications software, browser/interface software, etc.). The client systems may also present a graphical user interface (e.g., GUI, etc.) or other user interface 50 (e.g., command line prompts, menu screens, etc.) to facilitate entry of query terms and display query results.

Server systems 10 may be implemented by any conventional or other computer systems preferably equipped with a base (e.g., including at least one processor 21, one or more memories 26 and/or internal or external network interfaces or communications devices 11 (e.g., modem, network cards, etc.)), optional input devices (e.g., a keyboard, mouse or other input device), optional display devices (e.g., a display or monitor), and any commercially available and custom software (e.g., server/communications software, query optimizer 16, statistics collection and management module 63, query performance module 65, browser/interface software, etc.).

A database system 18 may store data that is accessed in response to a query. The data may be stored as records, tables, rows, columns, etc., in a database. The database system 18 may be implemented by any conventional or other database or storage unit, may be local to or remote from server systems 10 and client systems 14, and may communicate via any appropriate network 12 or communication medium (e.g., local area network (LAN), wide area network (WAN), Internet, hardwire, wireless link, Intranet, etc.), and may be equipped with at least one processor 22, one or more memories 27 and/or internal or external network interfaces or communications devices 17 (e.g., modem, network cards, etc.), and any commercially available or custom software (e.g., database software, etc.). Data 66 represents the data stored in the database, and is characterized by collected statistics 62.

Server system 10 includes a query optimizer 16 that may include one or more modules or units to perform the various functions of present invention embodiments described herein. The various modules (e.g., statistics collection and management module 63, query performance module 65, etc.) may be implemented by any combination of any quantity of software and/or hardware modules or units, and may reside within memory 26 of the server for execution by processor 21.

In particular, query optimizer 16 may comprise statistics collection and management module 63, query performance module 65, as well as data utilized as part of the query optimization process, including predetermined states of conditions 64, and collected statistics 62. Statistics collection and management module 63 may collect statistics (collected statistics 62) regarding data 66 stored in database 18, as referenced throughout this application, and may determine whether to discard or keep the collected data, as well as whether to disable subsequent collection of the statistic. Module 63 also determines, for a statistic that has been discarded, whether to re-enable collection of the statistic in response to changes in the data 66.

Query performance module 65 calculates a time to compute a given query for a particular access path based upon a given access path and collected statistics 62 and/or predetermined states of conditions 64 (e.g., including predetermined states of conditions that characterize the frequency, correlation, and distribution of the data 66), and selects the best access path for executing a query. By considering a plurality of access paths and corresponding statistics/states of conditions for each path, module 65 selects the most efficient access path for execution of the query.

An access path is a unary operation used by a query to retrieve rows from a row source, e.g., a table, a view, a result of a join or a grouping operation, etc. For a given query execution, the query optimizer 15 may evaluate the collected statistics 62 or predetermined states of conditions 64 to obtain information regarding the number of qualified rows (the number of rows to be processed) in each step of the query. Based upon this information, a time to compute the query may be calculated for each access path, and the best access path selected.

An example of different access paths is provided as follows. For a single table query, a table may be accessed directly by scanning the data within the table or indirectly by an index corresponding to the table. Accordingly, a decision may be made regarding the best access path for the table, if a large amount of the data within the table is relevant to the query, scanning the data will generally be more efficient. If a small amount of the data within the table is relevant to the query, then the index will generally be more efficient.

Query optimizer 16 may comprise stored collected statistics 62 and predetermined states of conditions 64. Predetermined states of conditions are statistical assumptions used by the query optimizer in lieu of collected statistics. Predetermined states of conditions are estimates regarding characteristics of data stored in the database, e.g., an estimate of a frequency of occurrence or a distribution for each value. Collected statistics are statistics reflecting the actual characteristics of data stored in the database, e.g., an actual frequency of occurrence or an actual distribution for each value.

Types of collected statistics include data distribution statistics including frequency of a value and histogram statistics for a value, as well as correlation statistics. A correlation statistic involves a dependence of one value on another value. An example of a correlation statistic is the relationship between a city (e.g., Rochester, San Jose, etc.) and a state (e.g., California, New York, etc.). Not every city is in every state, and accordingly, the city and state variables are not independent from each other. A frequency of a value is the number of times that a value occurs within a given data set. A histogram statistic is a frequency of a value over a range.

However, when collected statistics provide full domain coverage, the collected statistics may provide value for a query regarding a value that is not in the domain, and therefore, these statistics should generally not be removed. A column may comprise data, wherein each data value of the column is one of a finite set of possible values. For example, statistics may show that there are 2 possible values and 50% of the data is value 'A' while 50% of the data is value 'B'. With only 2 possible values, each value may be expected to represent 50% (or about 50%) of the data, which may imply that this statistic is not valuable. However, the presence of distribution statistics for all values indicates that no other values are present, e.g., a given value is value 'X' or value 'Y'. Accordingly, this statistic provides full domain coverage by representing that all values are either 'A' or 'B', and therefore, this statistic should generally not be removed.

Figure 2:
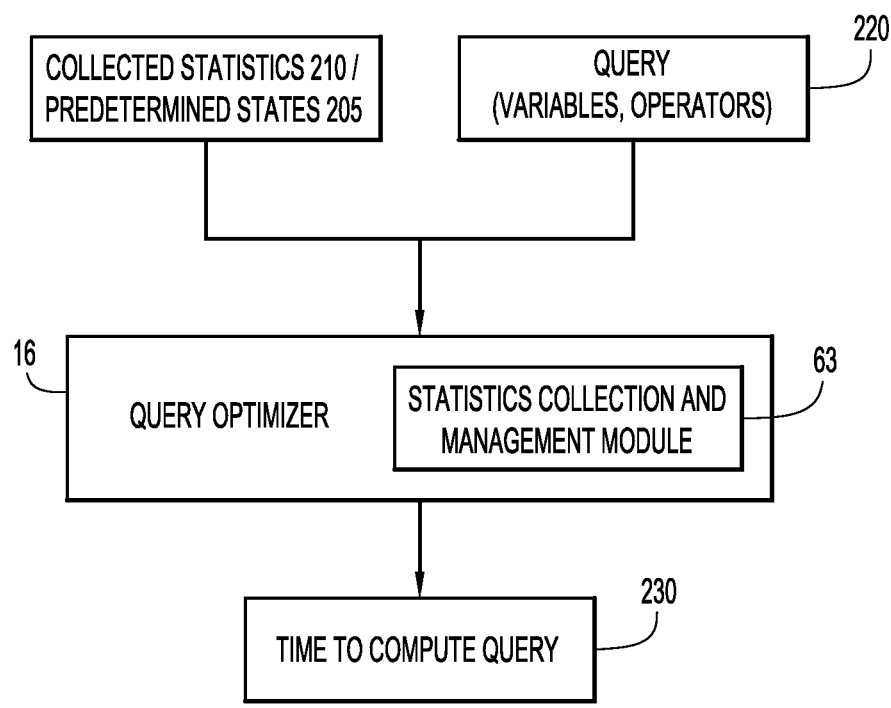
FIG. 2 is an illustration showing operations of a query optimizer in accordance with an embodiment of the present invention.

FIG. 2 shows an illustration of inputs and outputs for query optimizer 16. A query optimizer utilizes collected statistics or predetermined states of conditions along with the query itself to calculate a time to compute a given query for a given access path. Cost-based query optimization computes a cost for how long executing the query will take for a given access path.

Query optimizer 16 receives as inputs predetermined states 205 and/or collected statistics 210. Query optimizer 16 also receives as input the query itself, query 220, including variables, operators, etc. Based on this information, query optimizer 16 calculates a time to complete the query 230, for a given access path of a plurality of access paths. Accordingly, the query optimizer 16 will seek to select the lowest cost access path.

As indicated previously, predetermined states 205 and/or collected statistics 210 may be utilized to provide an estimate or an actual amount of the number of qualified rows for each step in the execution of a query. When the statistical assumptions (predetermined states of conditions) by the query optimizer are correct or are within a designated tolerance, the query optimizer does not need to collect statistics, as the collected statistics provide no value as compared to the predetermined states. Collected statistics that provide no value can be eliminated and subsequent collection disabled.

Figure 3:
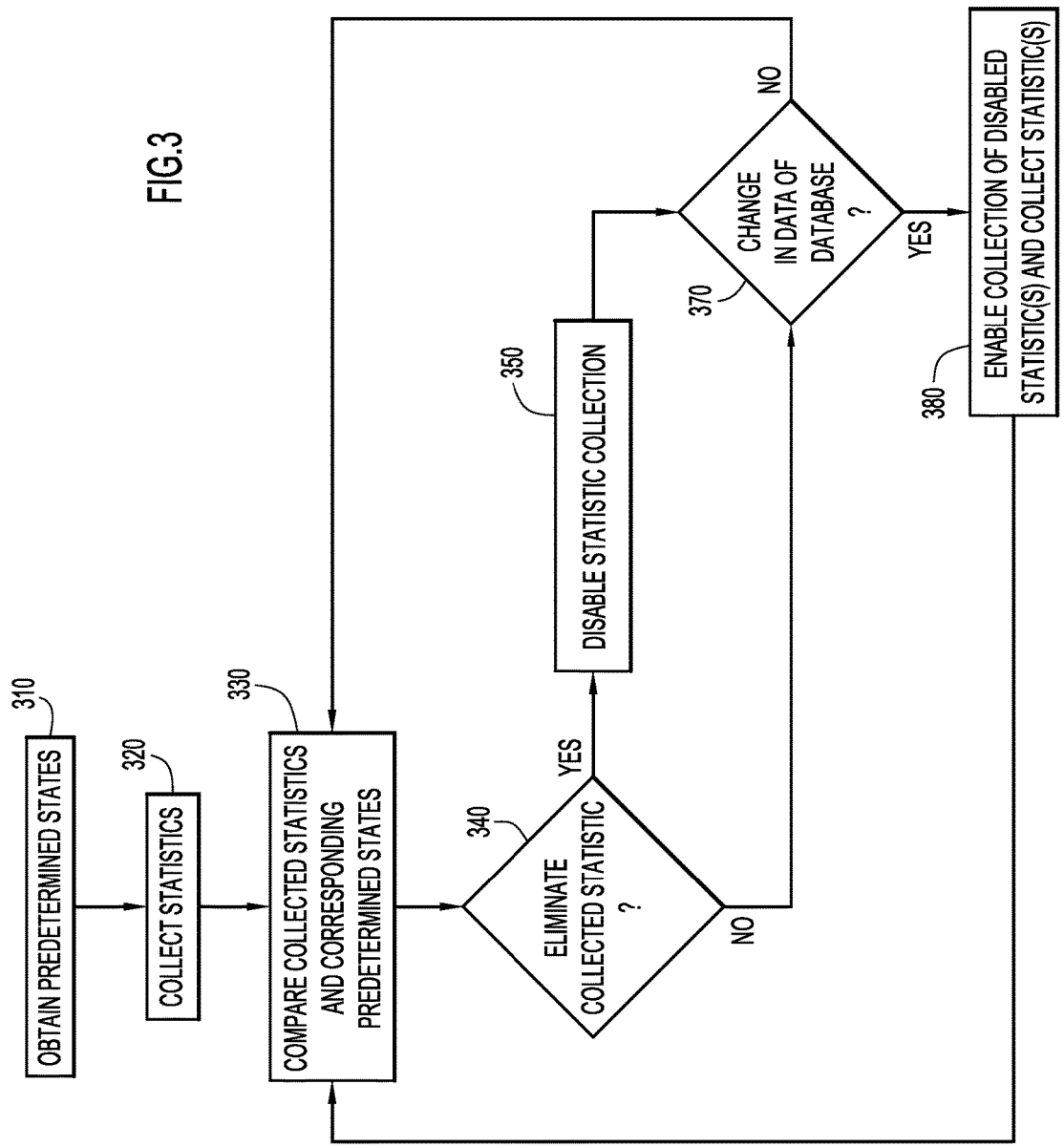
FIG. 3 is a procedural flow chart showing identification and elimination of non-essential statistics and disablement of subsequent collection of the identified statistics in accordance with an embodiment of the present invention.

FIG. 3 shows an example flow diagram of identifying non-essential statistics and disabling subsequent collection of the non-essential statistics. At operation 310, predetermined states are obtained. At operation 320 statistics are collected. In some embodiments, statistics may be collected by executing a utility, application etc. Statistic collection may be initiated manually, e.g., triggered by an administrator, or initiated automatically, e.g., triggered by a change in a condition or state of a database, e.g., a change in an amount of data or a change in associated metadata of the data in a database. At operation 330, collected statistics and corresponding predetermined states are compared to determine, whether the cost of collecting the given statistic and the impact of the given collected statistic to query optimization provides value (in terms of allowing an accurate time to query completion to be calculated) as compared to utilizing a corresponding predetermined state of condition (an estimated statistic). Accordingly, based on this comparison, a decision may be made as to whether the collected statistic should be eliminated/discarded at operation 340. In the event the statistic is eliminated/discarded, at operation 350, collection of that statistic for ongoing/future statistic collection is disabled, as there is no benefit to collecting the statistic.

In some aspects, statistics that have been identified as being non-essential are tracked by the query optimizer to prevent subsequent collection of these statistics based on one or more rules. For instance, processes that recommend statistics for collection typically do so based on heuristic rules. Eliminated statistics may be tracked to ensure that these statistics are not recollected based on a recommendation from such processes. As an example of a heuristic rule, a database system may recommend collection of frequency statistics for columns with low column cardinality as low cardinality columns are generally not evenly distributed.

At operation 370, the database is evaluated to determine if there is a change in the data of the database, as referenced below. If the data has changed, collection of the disabled statistic may be re-enabled at operation 380 and the statistic recollected. The data that the statistics represent may change over time, and accordingly, statistics that are determined to provide no value at a given point in time, may provide value at a future point in time. Therefore, reevaluating whether to recollect the statistic at a future point in time may be needed.

In general, any technique for evaluating whether an appreciable change in data has occurred may be utilized for determining whether a statistic should be recollected. Examples of determining whether a change in database data has occurred and may impact collected statistics include, but are not limited to: (1) determining whether an increase in the size of the table (e.g., an influx of new data) has occurred, and (2) determining whether a change in cardinality, e.g., with regard to a column, wherein cardinality is the number of times that a particular value is expressed in a data set, has occurred. For a table with an increased amount of new data, the new data could change the frequency, correlation or distribution of values within the data set, and therefore, necessitate re-enabling collection of a statistic. For a table with a fixed or relatively fixed size, the data may be updated, such that the updated data changes the frequency, correlation, or distribution of values within the data set, and therefore, may necessitate re-enabling collection of a corresponding statistic.

In some aspects, cardinalities of columns of the database may be stored, when the collection of the one or more identified statistics is disabled. By comparing stored column cardinalities to corresponding cardinalities of the data determined at a later time, a determination may be made as to whether the data has changed.

In other aspects, a size of a table of the database may be stored when the collection of the one or more identified statistics is disabled. By comparing the stored table size to a corresponding table size at a later time, a determination may be made as to whether the data has changed.

Figure 4:
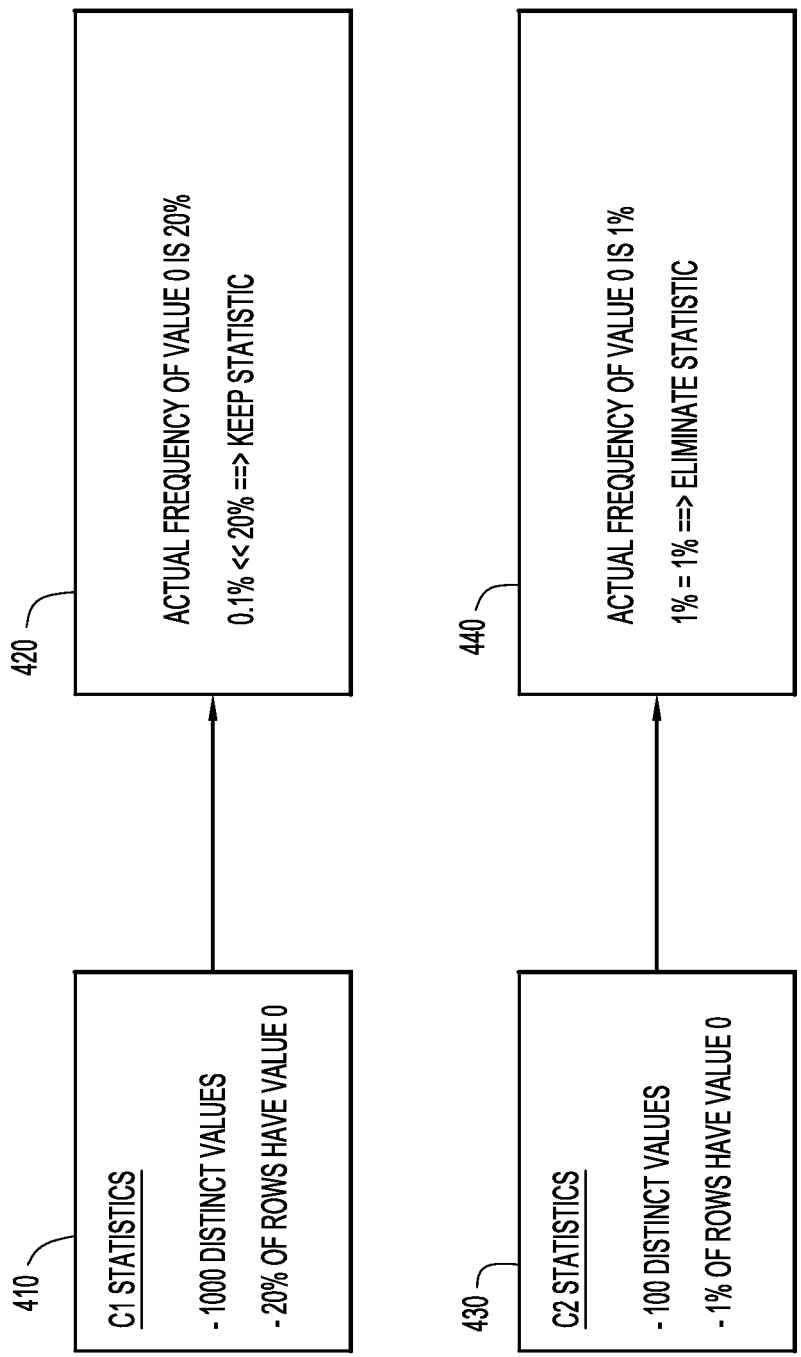
FIG. 4 is an example of identifying non-essential statistics and essential statistics in accordance with an embodiment of the present invention.

FIG. 4 shows an example of determining whether collection of a statistic provides value to a query optimizer. Statistics from collection that do not change the underlying statistical assumptions (the predetermined states) made by the query optimizer are eliminated from collection. It is noted that while this example pertains to frequency statistics, present invention embodiments also apply to correlation and histogram statistics.

According to block 410, statistics are collected for a selected portion of data stored in a database (C1). This portion of data has 1000 distinct values, wherein a frequency of the particular value zero is 20%, that is, 20% of rows have a value of zero. As shown in block 420, a query optimizer may estimate, according to predetermined states, that each value occurs with a frequency of $1/1000=0.1\%$. However, for a particular value of zero, the actual frequency is 20%. Accordingly, given the significant variation between the predetermined state of 0.1% and the collected statistic of 20%, the collected statistic should be maintained.

As another example, statistics are collected for another selected portion of data stored in a database (C2) as shown at block 430. This portion of data has 100 distinct values, wherein a frequency of the particular value 0 is 1%, that is, 1% of rows have a value of zero. A query optimizer may estimate, according to predetermined states, that each value occurs with a frequency of $1/100=1\%$. As shown in block 440, the actual frequency of the value 0 is 1%. Since the predetermined state of 1% and the collected statistic of 1% are the same (or within a designated tolerance), the collected statistic should be eliminated, and subsequent collection disabled as the collected statistic has little value.

Without collected statistics, a relational database may estimate (based on predetermined states of conditions) that the data is evenly distributed. Thus, if collected statistics indicate that the data is within a designated tolerance of an "even" distribution, the collected statistic can be removed.

As another example, a database may contain data reflecting transactions in 20 different countries. For a query designed to obtain information about transactions in one of the 20 countries, e.g., country A, a predetermined state for the query optimizer may assume a uniform distribution of data with respect to each country, and therefore, would determine an occurrence of a transaction in any particular country to occur at a frequency of 1 in 20. Therefore, for a data set of 5000 records, the query optimizer may calculate the processing time for the query regarding country A to be an amount of time proportional to reading 5% of the records (250 records). However, by collecting statistics on the data set, it may be determined that more transactions occurred in country A than in any other country, e.g., 3000 records, and therefore, the collected statistic would reflect the occurrence of country A to be 60% in the data set. In this case, the collected statistic would be maintained and used for calculating the processing time for the query.

Figure 5:
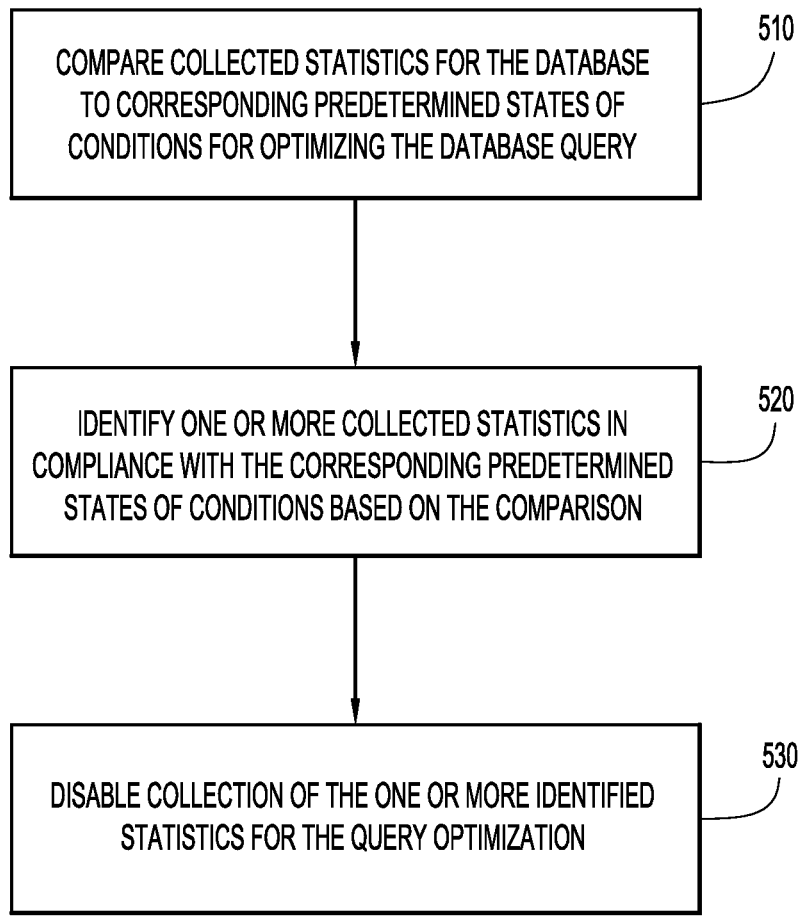
FIG. 5 is a procedural flow chart showing operations associated with identification and elimination of non-essential statistics and subsequent disablement of collection of the identified statistics in accordance with an embodiment of the present invention.

FIG. 5 shows operations to identify and disable statistics in accordance with an embodiment of the present invention. At operation 510, collected statistics for the database are compared to corresponding predetermined states of conditions for optimizing the database query. At operation 520, one or more collected statistics in compliance with the corresponding predetermined states of conditions are identified based on the comparison. At operation 530, collection of the one or more identified statistics for the query optimization is disabled.

It will be appreciated that the embodiments described above and illustrated in the drawings represent only a few of the many ways of implementing embodiments for identifying and removing non-essential statistics in a query independent manner. As the determination as to whether a collected statistic provides value is based on other statistics, the determination may be made without reference to query content (in a query independent manner). Present invention embodiments may provide an immediate performance improvement upon implementation.

The environment of the present invention embodiments may include any number of computer or other processing systems (e.g., client or end-user systems 14, server systems 10, etc.) and databases 18 or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, query optimizer 16, statistics collection and management module 63, query performance module 65, etc.). These systems may include any types of monitors and input devices (e.g., keyboard, mouse, voice recognition, etc.) to enter and/or view information.

It is to be understood that the software (e.g., query optimizer 16, statistics collection and management module 63, query performance module 65, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardware, modem connection, wireless, etc.). For example, the functions of the present invention embodiments may be distributed in any manner among the various end-user/client 14 and server systems 10, and/or any other intermediary processing devices. The software and/or algorithms described above and illustrated in the flow charts may be modified in any manner that accomplishes the functions described herein, in addition, the functions in the flow charts or description may be performed in any order that accomplishes a desired operation.

The software of the present invention embodiments (e.g., query optimizer 16, statistics collection and management module 63, query performance module 65, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.) The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, intranet, etc.).

The system may employ any number of any conventional or other databases, data stores or storage structures (e.g., files, databases, data structures, data or other repositories, etc.) to store information (e.g., data 66, collected statistics 62, predetermined states 64, etc.). The database system may be implemented by any number of any conventional or other databases, data stores or storage structures (e.g., files, databases, data structures, data or other repositories, etc.) to store information (e.g., data 66, collected statistics 62, predetermined states 64, etc.). The database system may be included within or coupled to the server 10 and/or client 14 systems. The database systems 18 and/or storage structures may be remote from or local to the computer or other processing systems, and may store any desired data (e.g., data 66, collected statistics 62, predetermined states 64, etc.).

The present invention embodiments may employ any number of any type of user interface (e.g., Graphical User interface (GUI), command-line, prompt, etc.) for obtaining or providing information (e.g., information to execute queries, information to display results of queries, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators links, tabs, etc.) to navigate between the screens in any fashion.

The present invention embodiments are not limited to the specific tasks or algorithms described above, but may be utilized for any application in which elimination of non-essential collected statistics, in a query-independent manner, may be desirable.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD) a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified hi the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for optimizing a database query comprising:
a storage device storing underlying assumptions about data in a database to optimize the database query, wherein the underlying assumptions include predetermined states of conditions for data in the database, and wherein the predetermined states of conditions include predetermined estimated values for characteristics of the data within the database;
at least one processor including a query optimizer configured to utilize the underlying assumptions in the storage device to optimize the database query, and the at least one processor is configured to:
    retrieve the underlying assumptions including the predetermined states of conditions from the storage device;
    determine correctness of the retrieved underlying assumptions of the query optimizer by comparing collected statistics for the database to corresponding ones of the retrieved predetermined states of conditions for optimizing the database query, wherein the collected statistics include actual values for characteristics of the data in the database, and wherein the predetermined estimated values of the retrieved predetermined states of conditions are used for optimizing the database query in place of corresponding collected statistics;
    identify one or more collected statistics that verify the retrieved underlying assumptions and are in compliance with the retrieved corresponding predetermined states of conditions based on the comparison;
    disable collection of the one or more identified statistics for the query optimization, wherein collection remains enabled for at least one collected statistic non-compliant with the retrieved predetermined states of conditions;
    optimize the database query for faster processing by determining a time to compute the database query for each of a plurality of access paths based on the at least one collected statistic for which collection remains enabled and the retrieved predetermined states of conditions associated with the one or more identified statistics, and selecting an access path for execution of the database query based on the determined times;
    enable recollection of at least one of the one or more identified statistics in response to an evaluation of changes of data in the database rendering the retrieved underlying assumptions incorrect based on non-compliance of the at least one identified statistic with the retrieved predetermined states of conditions, wherein the at least one statistic for which recollection is enabled is used for optimizing the database query in place of corresponding ones of the retrieved predetermined states of conditions; and
    compare the at least one recollected statistic to corresponding ones of the retrieved predetermined states of conditions and disable recollection of the at least one recollected statistic in response to the at least one recollected statistic verifying the retrieved underlying assumptions and being in compliance with corresponding ones of the retrieved predetermined states of conditions.

2. The system of claim 1, wherein the collected statistics include one or more from a group of data distribution statistics and data correlation statistics.

3. The system of claim 1, wherein the at least one processor is further configured to:
track the one or more identified statistics to prevent subsequent collection of those statistics based on one or more rules.

4. The system of claim 1, wherein the at least one processor is further configured to:
store cardinalities of columns of the database when the collection of the one or more identified statistics is disabled; and
compare the stored column cardinalities to corresponding cardinalities of the data at a later time to determine the change in the data.

5. The system of claim 1, wherein the at least one processor is configured to:
store a size of a table of the database when the collection of the one or more identified statistics is disabled; and
compare the stored table size to a corresponding size of the table at a later time to determine the change in the data.

6. The system of claim 1, wherein the at least one processor is configured to:
determine that the one or more collected statistics are not in compliance with corresponding ones of the retrieved predetermined states of conditions by determining that the one or more collected statistics are not the same as or are not within a designated tolerance of corresponding ones of the retrieved predetermined states of conditions.

7. A computer program product for optimizing a database query, the computer program product comprising a computer readable storage medium having computer readable program instructions embodied therewith, the computer readable program instructions executable by a processor including a query optimizer configured to utilize underlying assumptions about data in a database to optimize the database query, wherein the underlying assumptions are stored in a storage device and include predetermined states of conditions for data in the database, wherein the predetermined states of conditions include predetermined estimated values for characteristics of the data within the database, and the computer readable program instructions cause the processor to:

retrieve the underlying assumptions including the predetermined states of conditions from the storage device;

determine correctness of the retrieved underlying assumptions of the query optimizer by comparing collected statistics for the database to corresponding ones of the retrieved predetermined states of conditions for optimizing the database query, wherein the collected statistics include actual values for characteristics of the data in the database, and wherein the predetermined estimated values of the retrieved predetermined states of conditions are used for optimizing the database query in place of corresponding collected statistics;

identify one or more collected statistics that verify the retrieved underlying assumptions and are in compliance with the retrieved corresponding predetermined states of conditions based on the comparison;

disable collection of the one or more identified statistics for the query optimization, wherein collection remains enabled for at least one collected statistic non-compliant with the retrieved predetermined states of conditions;

optimize the database query for faster processing by determining a time to compute the database query for each of a plurality of access paths based on the at least one collected statistic for which collection remains enabled and the retrieved predetermined states of conditions associated with the one or more identified statistics, and selecting an access path for execution of the database query based on the determined times;

enable recollection of at least one of the one or more identified statistics in response to an evaluation of changes of data in the database rendering the retrieved underlying assumptions incorrect based on non-compliance of the at least one identified statistic with the retrieved predetermined states of conditions, wherein the at least one statistic for which recollection is enabled is used for optimizing the database query in place of corresponding ones of the retrieved predetermined states of conditions; and compare the at least one recollected statistic to corresponding ones of the retrieved predetermined states of conditions and disable recollection of the at least one recollected statistic in response to the at least one recollected statistic verifying the retrieved underlying assumptions and being in compliance with corresponding ones of the retrieved predetermined states of conditions.

8. The computer program product of claim 7, wherein the collected statistics include one or more from a group of data distribution statistics and data correlation statistics.

9. The computer program product of claim 7, wherein the computer readable program instructions cause the processor to:

track the one or more identified statistics to prevent subsequent collection of those statistics based on one or more rules.

10. The computer program product of claim 7, wherein the computer readable program instructions cause the processor to:

store cardinalities of columns of the database when the collection of the one or more identified statistics is disabled; and compare the stored column cardinalities to corresponding cardinalities of the data at a later time to determine the change in the data.

11. The computer program product of claim 7, wherein the computer readable program instructions cause the processor to:

store a size of a table of the database when the collection of the one or more identified statistics is disabled; and compare the stored table size to a corresponding size of the table at a later time to determine the change in the data.

12. The computer program product of claim 7, wherein the computer readable program instructions cause the processor to:

determine that the one or more collected statistics are not in compliance with corresponding ones of the retrieved predetermined states of conditions by determining that the one or more collected statistics are not the same as or are not within a designated tolerance of corresponding ones of the retrieved predetermined states of conditions.

* * * * *